(12) United States Patent  (10) Patent No.: US 8,756,632 B2
Etheredge et al.  (45) Date of Patent: Jun. 17, 2014

(54) ELECTRONIC PROGRAM GUIDE WITH TAGGING

(75) Inventors: Robert C. Etheredge, Orinda, CA (US); Daniel G. Dahl, Newark, CA (US)

(73) Assignee: Seachange International, Inc., Acton, MA (US)

( * ) Notice: Subject to any disclaimer, the term of this patent is extended or adjusted under 35 U.S.C. 154(b) by 238 days.

(21) Appl. No.: 13/275,604

(22) Filed: Oct. 18, 2011

(65) Prior Publication Data

US 2013/0097637 A1  Apr. 18, 2013

(51) Int. Cl.
*H04N 5/445* (2011.01)

(52) U.S. Cl.
USPC ............. 725/39; 725/46; 725/61; 725/105; 725/142

(58) Field of Classification Search
USPC ................................. 725/39, 46, 61, 142, 105
See application file for complete search history.

(56) References Cited

U.S. PATENT DOCUMENTS

| | | | |
|---|---|---|---|
| 6,005,562 A | 12/1999 | Shiga et al. | |
| 6,072,535 A | 6/2000 | Kearns | |
| 7,890,490 B1 | 2/2011 | Bovenschulte et al. | |
| 2005/0240965 A1 | 10/2005 | Watson et al. | |
| 2007/0079330 A1 | 4/2007 | Ludvig et al. | |
| 2010/0131567 A1* | 5/2010 | Dorogusker et al. | 707/802 |

* cited by examiner

*Primary Examiner* — Jivka Rabovianski
(74) *Attorney, Agent, or Firm* — Proskauer Rose LLP (57) ABSTRACT

Described are computerized methods and apparatuses, including computer program products, for providing electronic program guide services. The method includes storing an active media object list identifying media objects in an active state, receiving one or more tag requests identifying one or more programs, and updating a tag list to identify the one or more programs identified by the one or more tag requests. Each of the one or more programs are associated with one or more media objects. The method also includes generating a user navigation list comprising source identifiers of a plurality of selected media objects and a plurality of titles associated with each of the plurality of selected media objects. The plurality of selected media objects are each associated with at least one of the one or more programs identified in the tag list and included in the active media object list.

10 Claims, 6 Drawing Sheets

| Wednesday | | | | |
|---|---|---|---|---|
| | 8:00pm | 8:30pm | 9:00pm | 9:30pm |
| PBS | Documentary | Documentary | Symphony | |
| CBS | Game Show | | TV Show | TV Show |
| ABC | TV Show | | Movie | |
| NBC | TV Show | TV Show | TV Show | TV Show |
| FOX | TV Show | TV Show | TV Game Show | |
| CW | TV Show | TV Show | TV Show | TV Show |
| CNN | News Show | | News Show | |
| ESPN | Sports Show | | Sports Game | |
| USA | TV Show | TV Show | TV Show | TV Show |
| SYFY | Movie | | TV Show | TV Show |
| TNT | Movie | Movie | | TV Show |
| TBS | TV Show | | Movie | |

ELECTRONIC PROGRAM GUIDE WITH TAGGING

FIELD OF THE INVENTION

The present invention relates generally to a computer-implemented method, a computer program product and an apparatus for electronic programming guides. In one aspect, the electronic programming guide allows a user to tag television programs for subsequent filtering and navigation of television programming.

BACKGROUND

As the number of television stations and other media content access channels increase, the multitude of media content programming available to viewers is increasing at a significant rate. Electronic program guides (EPG) provide users of television, radio, and other media applications with scheduling information for available media content. Typically, viewers must consult lengthy program guides via their EPG in order to select programs for viewing. For example, if the viewer is interested in watching a particular set of programs, the viewer may need to read a multitude of program listings in order to learn when and on what channels those particular programs are being broadcast. In some cases, the viewer does not have a particular program in mind but is still interested in watching television or accessing a pre-recorded show. In these cases, the viewer would need to navigate their way through lengthy program guides, including information relevant to shows that the viewer would never be interested in watching.

Some EPGs allow viewers to program filters, in which the scheduling information presented to the user is limited to some subset of all available scheduling information. However, while filtering will help narrow the choices down, it is still difficult for viewers to navigate through pages of show names and remember what they want to watch. In addition, filters provided by EPGs are typically too rigid to cover all shows that viewers might be interested in.

SUMMARY

Embodiments of the invention disclosed herein include a computer-implemented method for an electronic program guide, the method comprising storing, on a computer-readable storage device, an active media object list identifying media objects in an active state, the media objects in an active state being defined by those media objects currently accessible by a user via one or more broadcast channels, one or more local media object storage devices, one or more remote media object storage devices, or any combination thereof; receiving, at an electronic program guide (EPG) device, one or more tag requests identifying one or more programs, each of the one or more programs being associated with one or more media objects; updating, by the EPG device, a tag list stored on the computer-readable storage device to identify the one or more programs identified by the one or more tag requests; receiving, at the EPG device, a guide information request for tagged media objects that are in an active state; generating, by the EPG device, a user navigation list comprising source identifiers of a plurality of selected media objects and a plurality of titles associated with each of the plurality of selected media objects, the plurality of selected media objects each being associated with at least one of the one or more programs identified in the tag list and being included in the active media object list; and transmitting the user navigation list to a display device for displaying one or more pairs of the plurality of source identifiers and titles. The method can further comprise receiving, at the EPG device, an access request identifying one of the plurality of source identifiers; and causing the media object associated with the one of the plurality of source identifiers to be transmitted to the display device. The media objects in an active state can comprise live broadcasts of audio/video content, previously recorded audio/video content, or any combination thereof.

Embodiments of the invention disclosed herein also include a computer program product, tangibly embodied in a machine-readable storage device, the computer program product including instructions being operable to cause data processing apparatus to perform steps, including those recited above. Further embodiments of the invention disclosed herein include a data processing apparatus for providing an electronic program guide that provide structure for performing functions, including those corresponding to the steps recited above.

BRIEF DESCRIPTION OF THE DRAWINGS

The foregoing and other features and advantages of the present invention, as well as the invention itself, will be more fully understood from the following description of various embodiments, when read together with the accompanying drawings.

DETAILED DESCRIPTION

Figure 1:
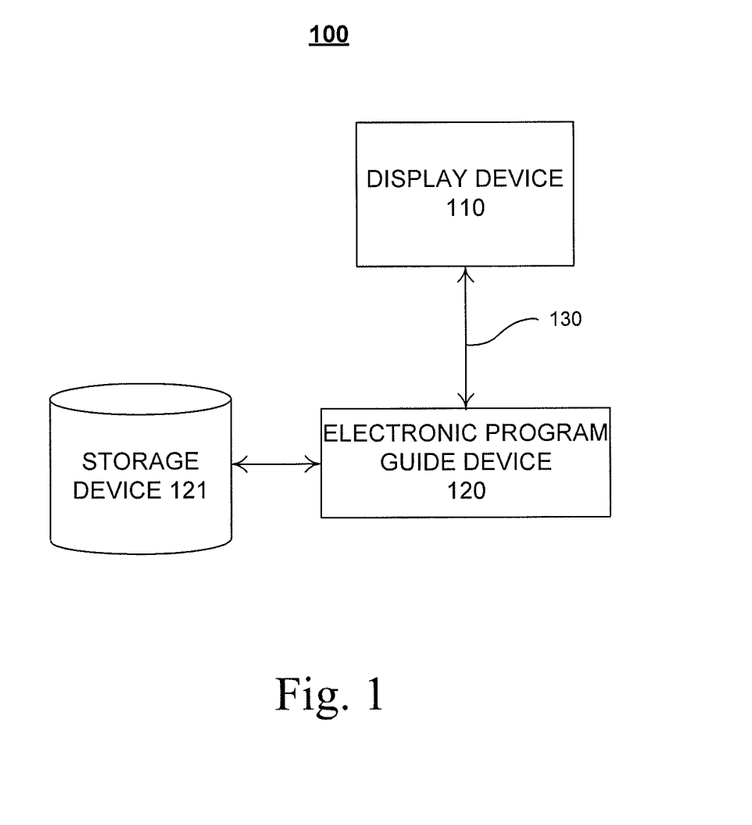
FIG. 1 is a block diagram showing an exemplary network with devices relating to an electronic program guide, according to an illustrative embodiment of the invention.

FIG. 1 is a block diagram showing an exemplary network 100 with devices relating to an electronic program guide, according to an illustrative embodiment of the invention.

The network 100 includes a display device 110, an electronic program guide (EPG) device 120, and a storage device 121. Display device 110 is coupled to EPG device 120 via communication link 130. Display device 110 can be a television, a desktop computer monitor, a mobile device (e.g., a smartphone or a tablet computer), or other devices for graphically displaying content (e.g., media objects). Media objects can include, for example, television broadcasts, radio broadcasts, and/or previously recorded (e.g., on a VCR, DVR, or back-end on-demand system) audio/video content. EPG device 120 includes a computer processing unit (not shown) that implements EPG functions and is coupled to a computer-readable storage device 121. Storage device 121 can be included in the same structure as EPG device 120 or can be locally or remotely located from EPG device 120.

In some embodiments, EPG device 120 can be a television set-top box, a cable box, a desktop computer, or other programming device (e.g., video cassette recorder (VCR) or digital video recorder (DVR)), which is locally connected to display device 110 (e.g., a television) via a local cable 130. In some embodiments, EPG device 120 can be included within the same structural housing as display device 110 (e.g., a smart phone or computer tablet), which are connected via an internal communications bus 130. In some embodiments, EPG device 120 can be remotely located from the display device 110 via one or more communication networks 130. For example, EPG device 120 can be located at a headend facility (e.g., a cable television headend), a video on-demand remote server, or other remotely located server system.

Figure 2:
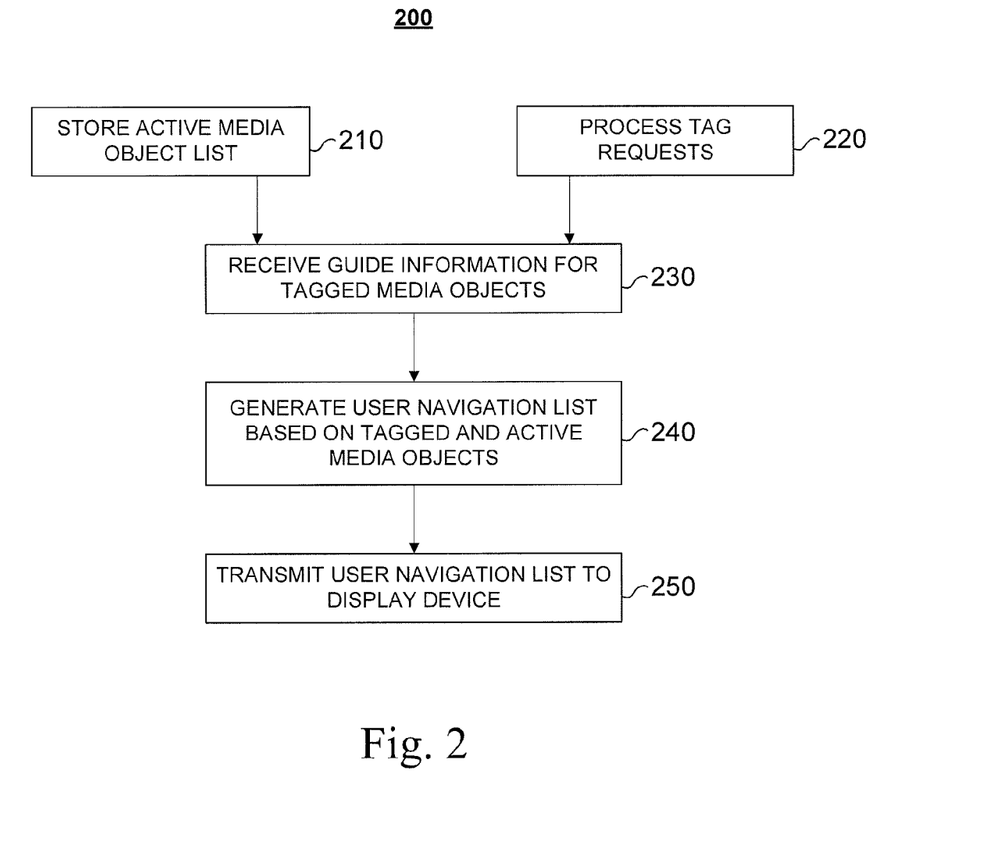
FIG. 2 is a flowchart depicting user navigation of media objects using tagging, according to an illustrative embodiment of the invention.

FIG. 2 is a flowchart 200 depicting user navigation of media objects using tagging, according to an illustrative embodiment of the invention. The elements of the flowchart 200 are described using the exemplary network devices of FIG. 1. User navigation of media objects using tagging includes storing, on storage device 121, an active media object list identifying media objects in an active state (210), processing one or more tag requests (220), receiving a guide information request for tagged media objects (230), generating a user navigation list based on tagged and active media objects (240), and/or transmitting the user navigation list to display device 121 (250).

In some embodiments, storing an active media object list identifying media objects in an active state (210) can include the EPG device 120 determining what media objects are in an active state (e.g., currently available for display on display device 110). For example, currently available media objects can include those currently being broadcast or transmitted via one or more broadcast channels, one or more local media object storage devices (e.g., VCR/DVR), one or more remote media object storage devices (e.g., an on-demand system), or any combination thereof. In alternative or supplemental embodiments, media objects in an active state can include those media objects that are scheduled to begin within a predetermined time period (e.g., all TV shows scheduled to begin in the next one hour time window will be considered to be in an active state).

Processing, by EPG device 120, the one or more tag requests (220) can include receiving one or more tag requests identifying one or more programs and updating a tag list stored on storage device 121. Tag requests can be received in a number of ways. For example, while a particular media object is being displayed on device 110, the viewer can "tag" the program associated with the displayed media object using a "tag" button on a remote control or by selecting an interface icon displayed on device 110. A user can similarly "tag" a program while browsing through scheduling information or advertisements (e.g., highlighting a particular show in a list of shows and "tagging" at as indicated above). Each of the one or more programs can be associated with one or more media objects. For example, a particular television program can be associated with each of the individual episodes (e.g., media objects) of that television program, both past and future. In some embodiments, the tag list can be in the form of a textual list of program identifiers. Manually tagging programs advantageously allows a user to customize a programming guide customized to their interests.

Generating a user navigation list based on tagged and active media objects (240) can include comparing the active media object list with the tag list and determining which active media objects are associated with a program stored on the tag list. Media objects that are both active and associated with a program stored on the tag list are selected for inclusion on the user navigation list. The user navigation list can include source identifiers (e.g., channel number, station name, station graphic, or any combination thereof) of selected media objects and title information associated with each of the plurality of selected media objects.

A user can use tagging information to more effectively navigate content scheduling information. For example, while viewing a typical scheduling list, the user can send EPG device 120 a request to filter out all non-tagged scheduling information. At any time (e.g., during regular content viewing or EPG interfacing), a user can access a list of channels containing tagged shows that are currently available via remote control (e.g., by pressing a special button or holding down the LAST button). Furthermore, a user can access tagging information by highlighting icons on a channel bar. Channel bars can include graphical overlays that display limited information about selected content. For example, while changing channels, a channel bar can be displayed, and by selecting an icon on the channel bar associated with tagging, the user can immediately jump to the next (if any) tagged show by the press of the channel up or down buttons. The above-identified requests by the user can be received as a guide information request for tagged media objects (230) at EPG device 120 via remote control and/or other user input device.

Figure 3:
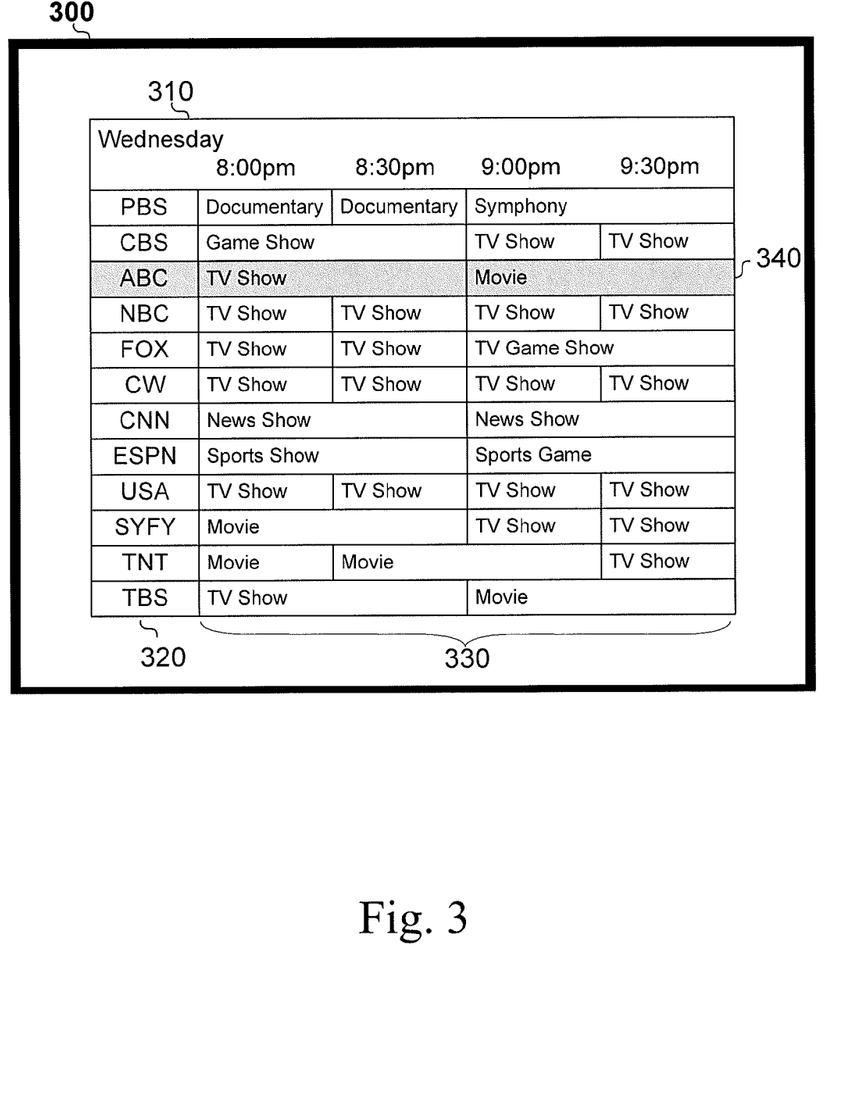
FIG. 3 illustrates a graphical user interface depicting a non-filtered EPG interface.

FIG. 3 illustrates a graphical user interface 300 depicting a non-filtered EPG interface 310. Interface 310 can, for example, be overlaid on a program that display device 110 is currently tuned to or take up the entirety of the display's viewing surface 300. Interface 310 can include timeline information 310, a column for source identifiers 320, and scheduling information for one or more media objects 330. At any given time, a user, via remote control, can select and/or highlight 340 a particular channel or media object.

Figure 4A:
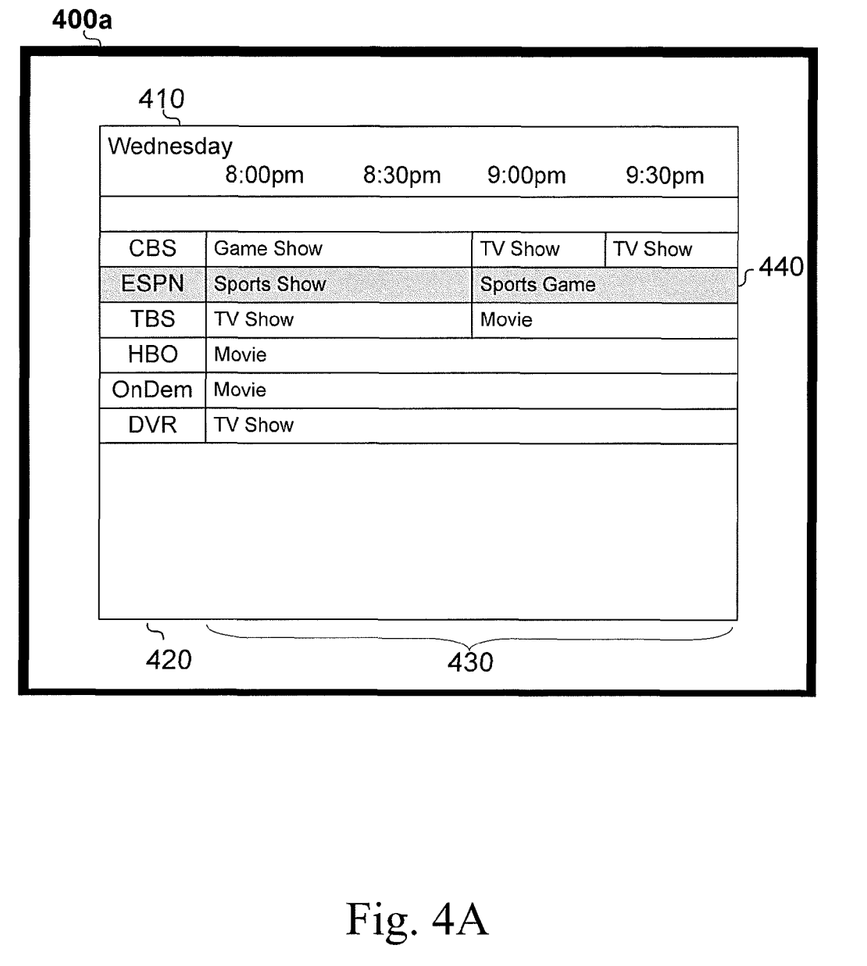
FIGS. 4A-4C illustrate graphical user interfaces depicting EPG interface use case examples.
Figure 4B:
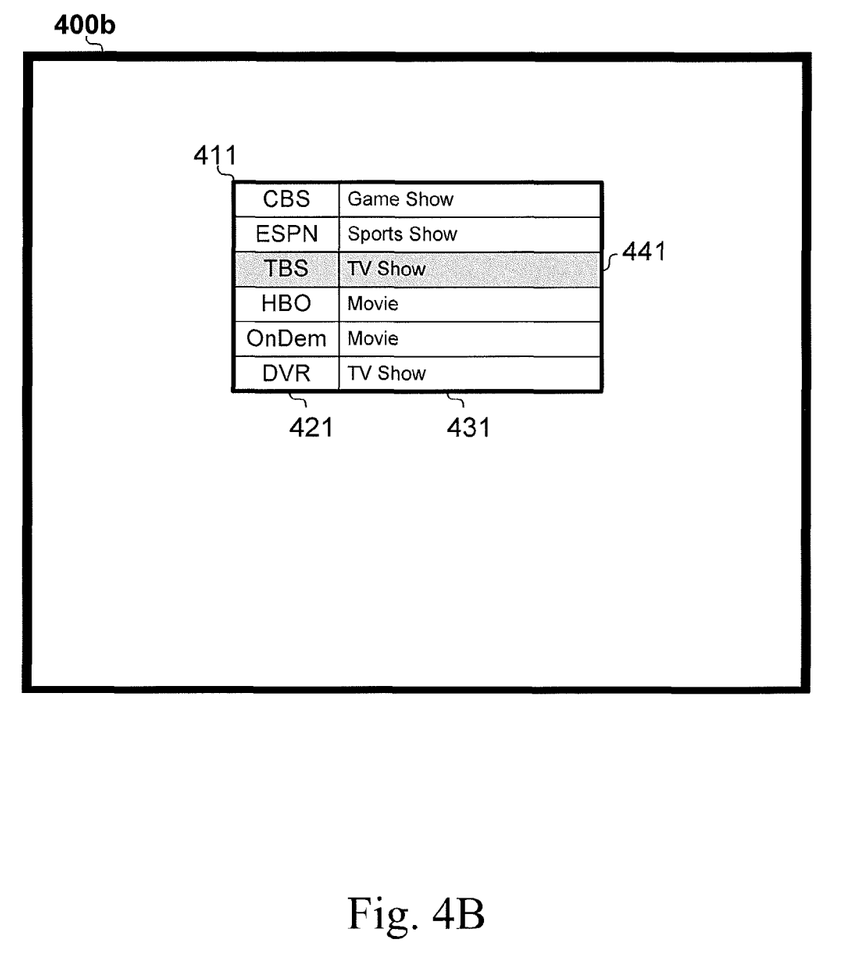
Figure 4C:
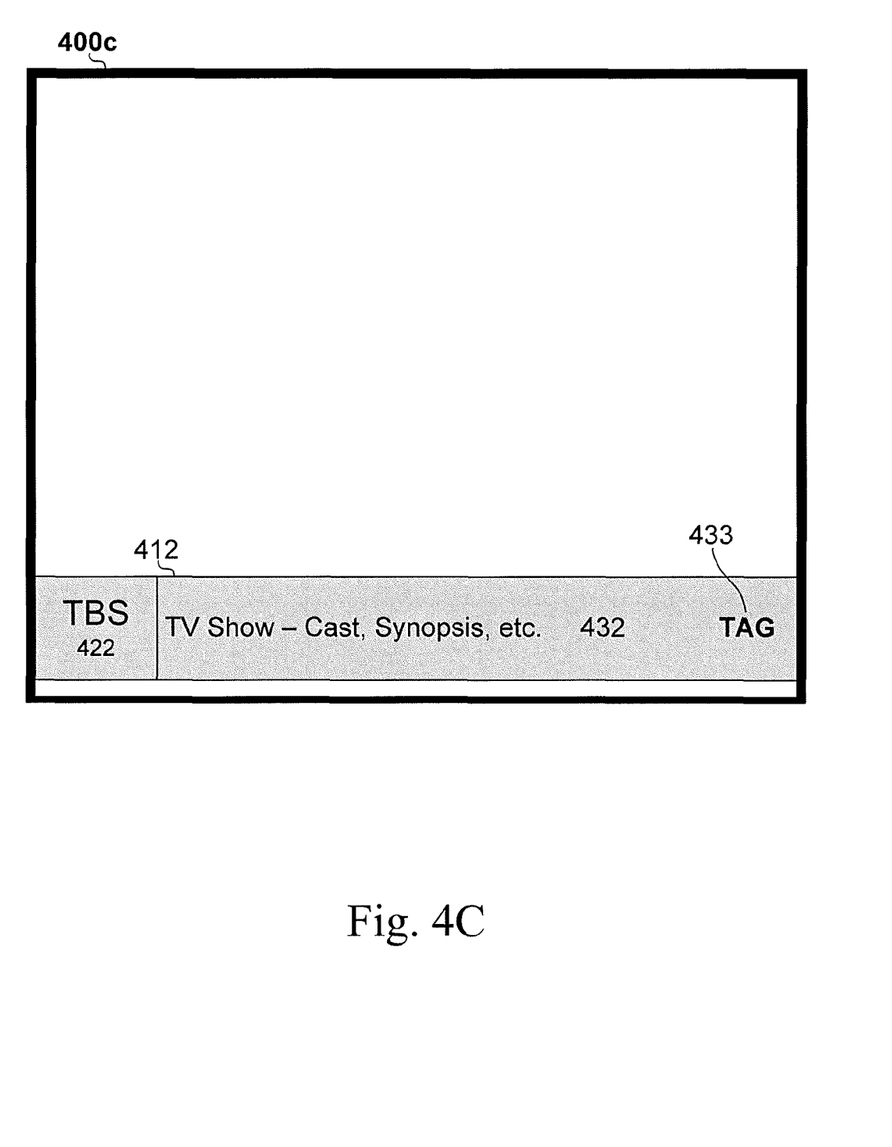

FIGS. 4A-4C illustrate graphical user interfaces 400a-400c depicting EPG interface use case examples. While viewing a typical scheduling list (e.g., interface 310), a user can send EPG device 120 a request to filter out all non-tagged scheduling information. FIG. 4A illustrates interface 400a, which includes an EPG interface 410 that lists only tagged media objects. Interface 410 includes source identifier information 420 along with title information 430 for the media objects associated with tagged programs. As before, a user, via remote control, can select and/or highlight 440 a particular channel or media object.

At any time (e.g., during regular content viewing or EPG interfacing), a user can access a list of channels containing tagged shows that are currently on via remote control (e.g., by pressing a special button or holding down the LAST button). For example, FIG. 4B illustrates interface 400b, which includes an EPG interface 411 interface 400b overlaid onto a portion of the viewing area. Interface 411 can include source identifier information 421 and/or title information 431 for the media objects associated with tagged programs. As before, a user, via remote control, can select and/or highlight 441 a particular channel or media object.

FIG. 4C illustrates interface 400c, which includes a channel bar interface 412. Channel bars can automatically appear when users are changing channels or can appear on request (e.g., via command from the remote control). Interface 412 includes a pairing of source identifier information 422 and title information 432. Interface 412 can also include an icon 433 represented that the identified media object has been tagged. In some embodiments, if the user highlights icon 433 and presses channel up/down, EPG device 120 will jump to the next source that includes a tagged and active media object. Alternatively, a remote control can include special channel up/down buttons/controls that allow the user to skip directly to the next channel with a tagged media object. The EPG interfaces 410, 411, 412 can be generated by EPG device 120 and transmitted for display on device 110.

The above-described techniques can be implemented in digital and/or analog electronic circuitry, in computer hardware, firmware, software, or in combinations thereof. The implementation can be as a computer program product, i.e., a computer program tangibly embodied in a machine-readable storage device, for execution by, or to control the operation of, data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use by a data processing apparatus. A computer program can be deployed to be executed on one computer or on multiple computers at one or more locations.

Method steps can be performed by one or more processors executing one or more computer programs to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital and/or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks, or flash-based drives. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a data processing apparatus in communication with a display device, e.g., a CRT (cathode ray tube), plasma, or LCD (liquid crystal display) monitor, for displaying information to the user, an input device, e.g., a remote control, a keyboard, and/or a pointing device, e.g., a mouse, a trackball, a touchpad, or a motion sensor, by which the user can provide input to the computer (e.g., interact with a user interface element). Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium 130 or others not shown, which can include any form or medium of digital or analog data communication (e.g., a communication network). The transmission mediums (e.g., link 130) can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer and reception over the transmission mediums can be based on one or more communication protocols. Communication protocols can include, for example, Ethernet protocol, Internet Protocol (IP), a Peer-to-Peer (P2P) protocol, Hypertext Transfer Protocol (HTTP), Session Initiation Protocol (SIP), a Global System for Mobile Communications (GSM) protocol, and/or other communication protocols.

One skilled in the art will realize the invention may be embodied in other specific forms without departing from the spirit or essential characteristics thereof The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for an electronic program guide, the method comprising:
    storing, on a computer-readable storage device, an active media object list identifying media objects currently accessible to a user over a plurality of broadcast channels;
    receiving, by an electronic program guide (EPG) device, a plurality of tag requests identifying a plurality of programs tagged by the user browsing with an electronic program guide using a remote control, each of the tagged programs being associated with a corresponding media object;

updating, by the EPG device, a tag list stored on the computer-readable storage device to identify the tagged programs;
receiving, by the EPG device, a guide information request from the user through the remote control;
in response to receiving the guide information request, comparing, by the EPG device, the active media object list with the tag list to determine a plurality of selected media objects that are currently accessible to the user over the plurality of broadcast channels and associated with one or more of the tagged programs;
generating, by the EPG device, a user navigation list comprising pairs of source identifiers and titles associated with each of the plurality of selected media objects; and
transmitting the user navigation list to a display device for displaying the user navigation list, enabling the user to select from amongst the pairs of source identifiers and titles to view.

2. The method of claim 1 further comprising:
receiving, at the EPG device, an access request identifying one of the plurality of source identifiers; and
causing the media object associated with the one of the plurality of source identifiers to be transmitted to the display device.

3. The computer implemented method of claim 1 further comprising:
receiving, by the EPG device, a guide information request from the user invoking a button on the remote control that provides last channel navigation functionality; and
transmitting, by the EPG device, the user navigation list to the display device for graphically displaying the user navigation list in its entirety within a single graphical overlay.

4. The computer implemented method of claim 1 further comprising transmitting, by the EPG device, the user navigation list to the display device for graphically displaying within a graphical channel bar overlay the title of a first media object associated with a tagged program identified in the user navigation list and jumping to a second media object associated with another tagged program identified in the user navigation list by selecting a channel up button or a channel down button on the remote control.

5. A computer program product, tangibly embodied in a machine-readable storage device, the computer program product including instructions being operable to cause data processing apparatus to:
store, on a computer-readable storage device, an active media object list identifying media objects currently accessible to a user over a plurality of broadcast channels;
receive a plurality of tag requests identifying a plurality of programs tagged by the user browsing with an electronic program guide using a remote control, each of the tagged programs being associated with a corresponding media object;
update a tag list stored on the computer-readable storage device to identify the tagged programs;
receive a guide information request from the user through the remote control;
in response to receiving the guide information request, comparing the active media object list with the tag list to determine a plurality of selected media objects that are currently accessible to the user over the plurality of broadcast channels and associated with one or more of the tagged programs;
generate a user navigation list comprising pairs of source identifiers and titles associated with each of the plurality of selected media objects; and
transmit the user navigation list to a display device for displaying the user navigation list, enabling the user to select from amongst the pairs of source identifiers and titles to view.

6. The computer program product of claim 5, including further instructions being operable to cause data processing apparatus to:
receive a guide information request from the user invoking a button on the remote control that provides last channel navigation functionality; and
transmit the user navigation list to the display device for graphically displaying the user navigation list in its entirety within a single graphical overlay.

7. The computer program product of claim 5, including further instructions being operable to cause data processing apparatus to:
transmit the user navigation list to the display device for graphically displaying within a graphical channel bar overlay the title of a first media object associated with a tagged program identified in the user navigation list and jumping to a second media object associated with another tagged program identified in the user navigation list by selecting a channel up button or a channel down button on the remote control.

8. A data processing apparatus for providing an electronic program guide, the data processing apparatus comprising:
means for storing, on a computer-readable storage device, an active media object list identifying media objects currently accessible to a user over a plurality of broadcast channels;
means for receiving a plurality of tag requests identifying a plurality of programs tagged by the user browsing with an electronic program guide using a remote control, each of the tagged programs being associated with a corresponding media object;
means for updating a tag list stored on the computer-readable storage device to identify the tagged programs;
means for receiving a guide information request from the user through the remote control;
means for comparing, in response to receiving the guide information request, the active media object list with the tag list to determine a plurality of selected media objects that are currently accessible to the user over the plurality of broadcast channels and associated with one or more of the tagged programs;
means for generating a user navigation list comprising pairs of source identifiers and titles associated with each of the plurality of selected media objects; and
means for transmitting the user navigation list to a display device for displaying the user navigation list, enabling the user to select from amongst the pairs of source identifiers and titles to view.

9. The data processing apparatus of claim 8 further comprising:
means for receiving a guide information request from the user invoking a button on the remote control that provides last channel navigation functionality; and
means for transmitting the user navigation list to the display device for graphically displaying the user navigation list in its entirety within a single graphical overlay.

10. The data processing apparatus of claim 8 further comprising:
means for transmitting the user navigation list to the display device for graphically displaying within a graphical channel bar overlay the title of a first media object associated with a tagged program identified in the user navigation list and jumping to a second media object associated with another tagged program identified in the user navigation list by selecting a channel up button or a channel down button on the remote control.

* * * * *